(12) United States Patent
Madineni et al.

(10) Patent No.: US 11,405,187 B2
(45) Date of Patent: Aug. 2, 2022

(54) EXTENDED-LIFE ASYMMETRIC CRYPTOGRAPHIC KEY SCHEME

(71) Applicant: International Business Machines Corporation, Armonk, NY (US)

(72) Inventors: Narayana Aditya Madineni, Southport (AU); Peter T. Waltenberg, Gold Coast (AU); Simon D. McMahon, GoldCoast (AU)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 16/861,590

(22) Filed: Apr. 29, 2020

(65) Prior Publication Data

US 2021/0344486 A1 Nov. 4, 2021

(51) Int. Cl.
*H04L 9/08* (2006.01)
*H04L 9/32* (2006.01)

(52) U.S. Cl.
CPC .......... *H04L 9/0825* (2013.01); *H04L 9/0869* (2013.01); *H04L 9/3247* (2013.01); *H04L 9/3263* (2013.01)

(58) Field of Classification Search
CPC ... H04L 9/0825; H04L 9/0869; H04L 9/3247; H04L 9/3263
USPC ........................................................ 713/171
See application file for complete search history.

(56) References Cited

U.S. PATENT DOCUMENTS

| 6,978,017 | B2 | 12/2005 | Wiener | |
|---|---|---|---|---|
| 7,929,701 | B1 | 4/2011 | Sprunk | |
| 8,074,073 | B2 * | 12/2011 | Gentry | H04L 9/0836 713/170 |
| 2005/0235140 | A1 * | 10/2005 | Hui | H04L 9/3268 713/156 |
| 2009/0006860 | A1 * | 1/2009 | Ross | H04L 63/126 713/189 |
| 2010/0082975 | A1 * | 4/2010 | Metke | H04L 63/064 713/157 |
| 2010/0174919 | A1 * | 7/2010 | Ito | G06F 21/554 713/192 |

(Continued)

FOREIGN PATENT DOCUMENTS

| EP | 3637297 A1 * | 4/2020 | ........... H04L 9/3265 |
|---|---|---|---|
| WO | 2004032416 A1 | 4/2004 | |

OTHER PUBLICATIONS

"Active Directory Certificate Services (AD CS) Public Key Infrastructure (PKI) Design Guide", printed on Feb. 18, 2020, 31 pages, <https://social.technet.microsoft.com/wiki/contents/articles/7421.active-directory-certificate-services-ad-cs-public-key-infrastructure-pki-design-guide.aspx>.

(Continued)

*Primary Examiner* — Khoi V Le
*Assistant Examiner* — Moeen Khan
(74) *Attorney, Agent, or Firm* — David B. Woycechowsky (57) ABSTRACT

Extending the useful life of finite lifetime asymmetric cryptographic keys by referencing the number of uses of the keys in conjunction with or instead of the elapsed time since generation of the finite lifetime keys. By integrating asymmetric cryptographic keys into a limited use security scheme, the lifetime of finite lifetime asymmetric cryptographic keys is based on the practical risk of security breach during use rather than an arbitrary duration in which the keys are valid.

3 Claims, 3 Drawing Sheets

(56) References Cited

U.S. PATENT DOCUMENTS

2015/0339664 A1* 11/2015 Wong .................. H04W 12/069
  705/71

OTHER PUBLICATIONS

"Round 2 Submissions—Post-Quantum Cryptography | CSRC", Created Jan. 3, 2017, Updated Feb. 10, 2020, 6 pages, <https://csrc.nist.gov/Projects/post-quantum-cryptography/round-2-submissions>.
Serpanos et al., "Increasing Symmetric Key Lifetime by Controlled Randomness*", © 2005 IEEE, vol. 2, 6 pages.

* cited by examiner

EXTENDED-LIFE ASYMMETRIC CRYPTOGRAPHIC KEY SCHEME

BACKGROUND

The present invention relates generally to the field of computer security, and more particularly to computer cryptographic keys.

A cryptographic key is a string of data that is used to lock or unlock cryptographic functions, including authentication, authorization and encryption. Cryptographic keys are grouped into cryptographic key types according to the functions they perform. A cryptographic key is categorized according to how it will be used and what properties it has. For example, a key might have one of the following properties: Symmetric, Public, or Private. Cryptographic keys may also be grouped into pairs that have one private and one public key, which is referred to as an asymmetric key pair. Cryptographic keys may also have keys that designate they can be used for long-term (static, archived) use or used for a single session (ephemeral). The latter generally applies to the use of an ephemeral key agreement key. Most other key types are designed to last for long crypto-periods from about one to two years. When a shorter crypto-period is designed different key types may be used."

A cryptographic key is referred to as an ephemeral key if it is generated for each execution of a key establishment process. In some cases, ephemeral keys are used more than once within a single session (for example, in broadcast applications) where the sender generates only one ephemeral key pair per message and the private key is combined separately with each recipient's public key.

Asymmetric cryptography, including public-key cryptography, is a cryptographic system that uses pairs of keys: (i) public keys that may be disseminated widely; and (ii) private keys that are known only to the owner. The generation of public-private keys depends on cryptographic algorithms based on mathematical problems to produce one-way functions. Effective security only requires keeping the private key private while the public key can be openly distributed without compromising security. In asymmetric cryptography systems, any person can encrypt a message using the public key, but the encrypted message can only be decrypted with the private key.

SUMMARY

According to an aspect of the present invention, there is a method, computer program product and/or system for a limited operation asymmetric cryptographic key scheme that performs the following operations (not necessarily in the following order): (i) configuring a master key pair for use in a cryptographic key system, the master key pair having certificate authority for a pre-defined number of signature operations; (ii) generating a plurality of random key pairs from the master key pairs; and (iii) establishing a first certificate chain layer for the plurality of random key pairs by creating subordinate certificates for each random key pair in the plurality of random key pairs, each random key pair having the pre-defined number of signature operations of the master key pair.

DETAILED DESCRIPTION

Some embodiments of the present invention are directed to extending the useful life of finite lifetime asymmetric cryptographic keys by referencing the number of uses of the keys in conjunction with or instead of the elapsed time since generation of the finite lifetime keys. By integrating asymmetric cryptographic keys into a limited use security scheme, the lifetime of finite lifetime asymmetric cryptographic keys is based on the practical risk of security breach during use rather than an arbitrary duration in which the keys are valid.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
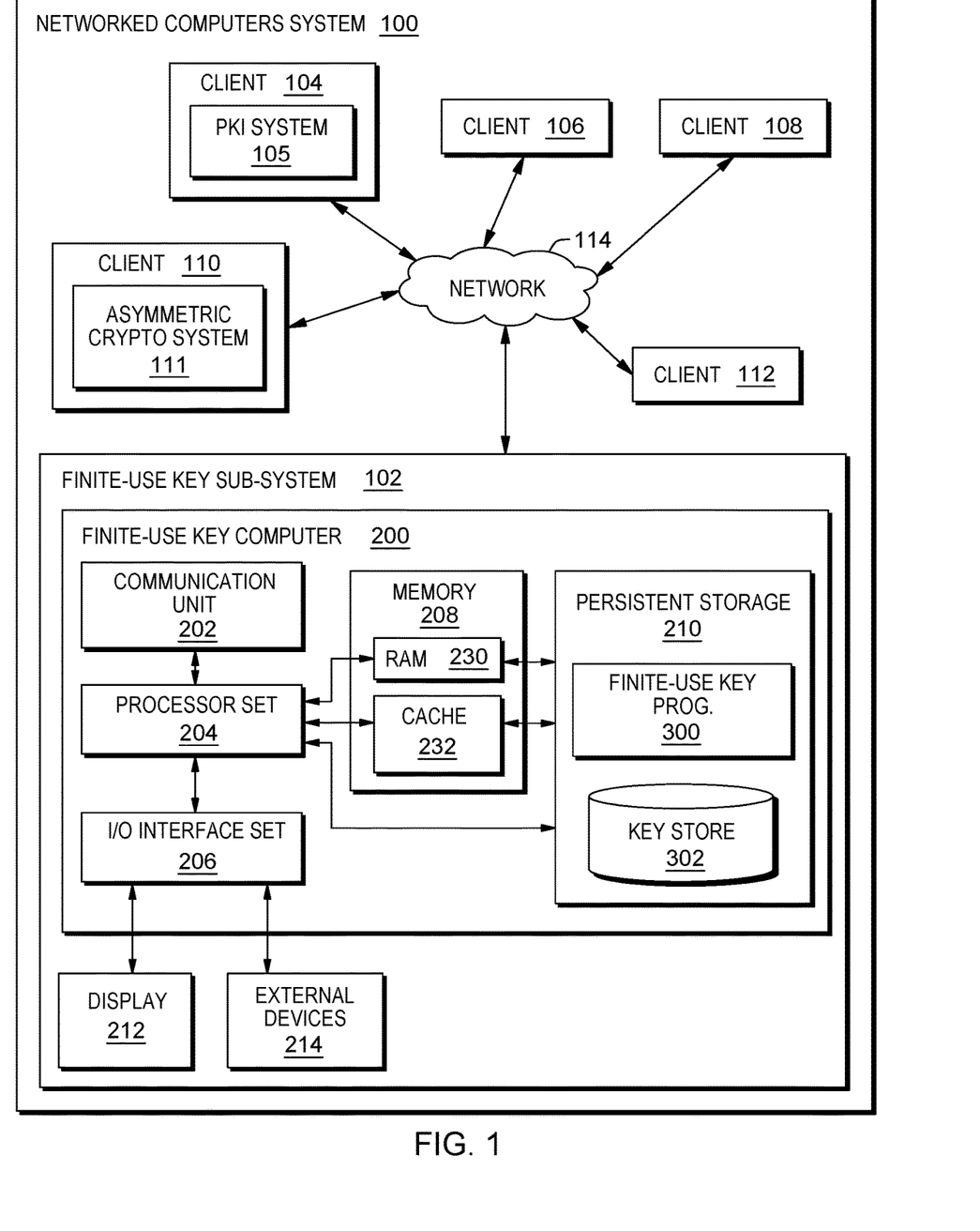
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; asymmetric crypto system 111; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database).

In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
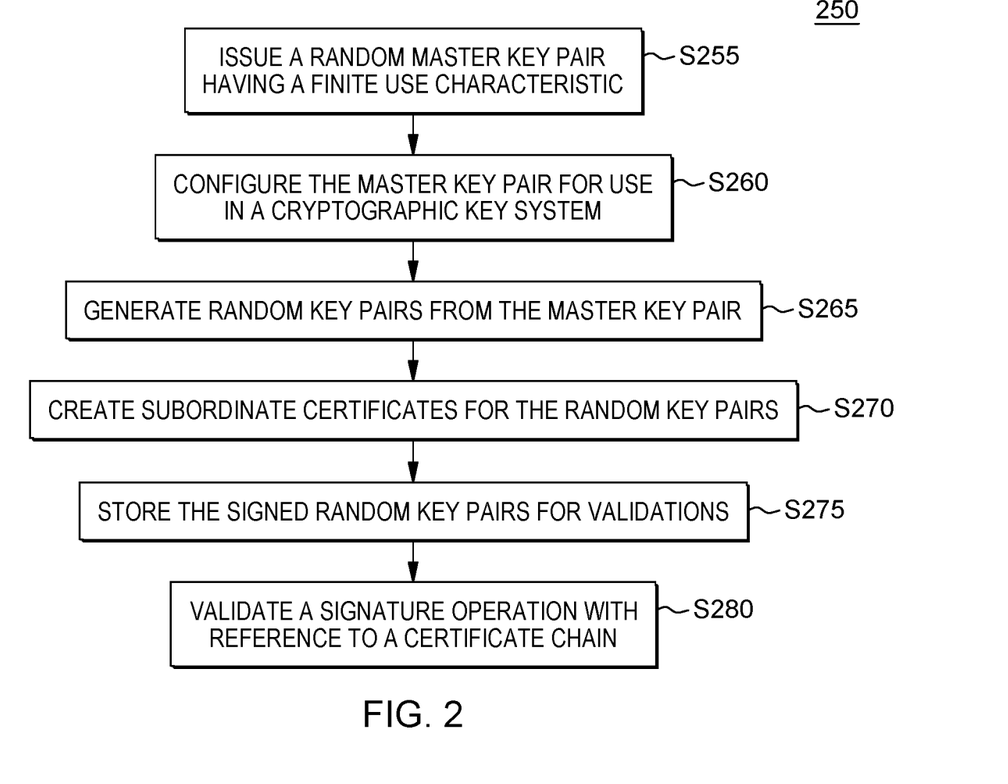
FIG. 2 is a flowchart showing a first embodiment method performed, at least in part, by the first embodiment system.
Figure 3:
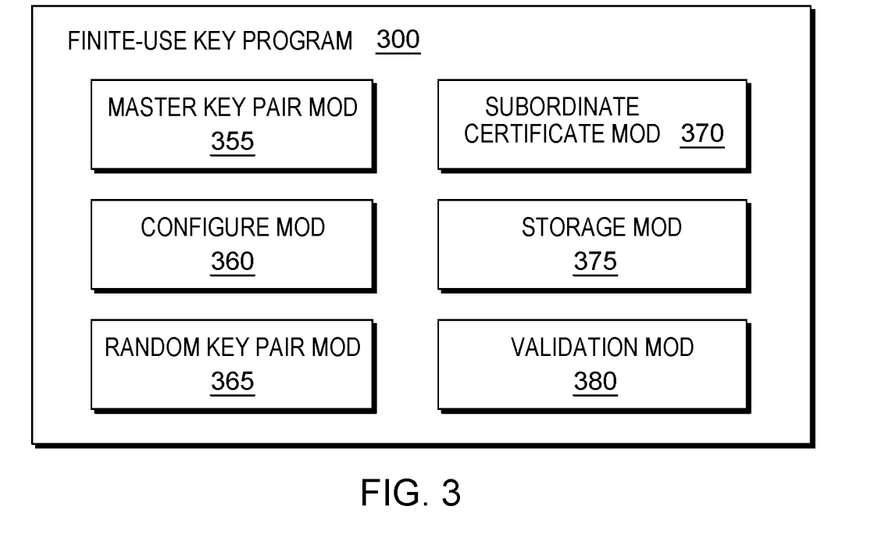
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, finite-use key program 300 performs or controls performance of at least some of the method operations of flowchart 250. This method and associated software will now be discussed, over the course of the following paragraphs, with extensive reference to the blocks of FIG. 1 (system of an embodiment of a hardware and software environment), FIG. 2 (method of operation blocks) and FIG. 3 (software blocks).

Some embodiments of the present invention are directed to a method to extend the usable life of keys that are limited by the number of operations that can be performed before being retired, to avoid being compromised, as determined by the limited operation key scheme. This method comprises the following operations as shown in FIG. 2.

Processing begins at operation S255, where master key pair module ("mod") 355 issues a random master key pair having a finite use characteristic. For each encryption algorithm used in a cryptographic key system, there is an assigned finite number of uses, or signature operations. In this example, the finite number of signature operations is known for the encryption algorithm to be used. Alternatively, a pre-defined number of uses is assigned to an encryption algorithm to be introduced in the cryptographic key system. In some embodiments of the present invention, the usable life of a master key pair in a public-key infrastructure (PKI) having a fixed period of time in which the private key is valid, is potentially extended such that a finite number of allowed signature operations are taken into account before the private key is retired. Furthermore, retiring a key in a PKI consists of deleting the private component or otherwise discontinuing to use the private component for generating signatures.

Processing proceeds to operation S260, where configure mod 360 configures the master key pair for use in a cryptographic key system. In this example, the configure mod establishes a subordinate certificate authority (sub CA) for the master key pair. The master key pair issued in step S265 is integrated into an existing PKI system by configuring it as a sub CA from a root CA of the PKI system. In this example, the master key pair (Public/Private) having a finite number of allowed signature operations is able to generate subordinate key pairs for an additional layer of limited-number-of-use pairs, effectively extending the use of the master key pair. Alternatively, the master key pair issued in step S265 is a root certificate authority (CA) from which a sub CA may be generated to establish a layer of limited-number-of-use pairs.

Processing proceeds to operation S265, where random key pair mod 365 generates a set of random key pairs from the master key pair. In this example, the number of random key pairs generated from the master key pair is one hundred (100). It should be noted that for many embodiments of the present invention the number of pairs in the set of random key pairs is more than one. Alternatively, the master key pair mod operates as a certificate authority and issues a set of random key pairs by performing the specified number of signing operations.

Processing proceeds to operation S270, where subordinate certificate mod 370 creates subordinate certificates from the master key pair certificate for use by the random key pairs. In this way, some embodiments of the present invention extend the lifetime of cryptographic key pairs using a hierarchy of subordinate certificates. Furthermore, each of the key pairs in the set of random key pairs can further create key pairs under their authority as subordinate certificate authorities. This mechanism has the effect of extending the lifetime of the original master key issued at step S255.

The operations S265 and S270 may be performed from each key pair generated for other layers beyond the first layer generated in step S265. Where each key pair generated in the previous layer acts in the way that the original master key does by generating another set of random keys and signing subordinate certificates in a next layer. As should be understood by persons of ordinary skill in the art, the number of available keys will grow exponentially as additional layers of key pairs are generated under the scheme presented herein.

Processing proceeds to operation S275, where storage mod 395 stores the set of subordinate key pairs for handling validations. In this example, subordinate key pairs generated at step 265 and signed for use at step S270 are valid subordinate key pairs. These valid key pairs are stored in key store 302 for handling validations. Alternatively, validation is handled remote from limited-use key sub-system such that storage of validation keys are stored in a client sub-system accessible over a network, such as network 114.

Processing concludes at operation S280, where validation mod 380, validates a random key pair used for a signature operation with reference to a certificate chain. Signatures are validated according to certificate chains including a certificate for each layer starting from the leaf node keys, which is in the "active" layer most distant from the master key pair. In operation, the leaf node keys are first used the specified number of times permitted prior to expiration. Leaf nodes are nodes having no children, where each leaf node represents a key pair having certificate authority from the master key pair issued at step 255 and not having generated a next layer of keys having subordinate certificate authority. Essentially, the key pairs that are the most distant from the master key pair according to the hierarchical layers of the extended life scheme presented herein. Leaf node keys are retired after the specified number of standard signature operations are performed. The certificate chain extends from the lead node key pair certificate to the master key pair certificate, which may depend from a root key having a root certificate. In some embodiments of the present invention, all leaf node key certificates are discarded after being used the specified number of times.

III. Further Comments and/or Embodiments

Some embodiments of the present invention recognize the following facts, potential problems and/or potential areas for improvement with respect to the current state of the art: (i) most cryptographic asymmetric keys are assessed as having a finite lifetime based on the estimated time required to break them; (ii) some algorithms have cryptographic keys which are only usable for a finite number of operations. In most cases such algorithms are not widely used, but there is always a risk that some algorithm that is widely accepted and deployed will fall into this class; (iii) the finite number of uses also makes a number of potential signature algorithms, including those proposed in NIST (national institute of standards and technology) Post-Quantum Competition (PQC), not particularly usable; (iv) PKI (public key infrastructure) systems are designed to establish keys with a lifetime, over a fixed period of time, as defined by a 'not before', 'not after' validity period; (v) PKI systems are not designed to establish keys with lifetime, based on the number of signatures generated within the validity period; (vi) difficulty in integrating keys with limited use, rather than limited life-time requirements, into current PKI systems; (vii) there is no method to extend the usable life of these keys, making them largely compatible with existing PKI methodologies; and (viii) still suffer some partial compromise in their operational use.

Some embodiments of the present invention may include one, or more, of the following operations, features, characteristics and/or advantages: (i) extends the usable life of finite lifetime asymmetric keys, which are limited by the number of allowed signing operations; (ii) extends the usable life of keys that are limited by the number of operations that can be performed, before being retired to avoid being compromised, as determined by the limited operation key scheme comprising: (a) issuing a random master key pair with finite number (N) of signature operations, (b) configuring the master key pair as a subordinate certificate authority (CA), (c) generating N random key pairs, (d) signing N keys generated in (c) to create N subordinate certificates, and (e) repeating steps (a) to (d) for M layers, where each key at the previous layer acts as a master key in operation (a) for generating N subordinate certificates in the next layer; (iii) the N^(M−1) leaf node keys can be used for 'N' standard signature operations each; (iv) signatures created in (ii) above are validated using certificate chains of 'M' certificates starting from leaf to the root certificate; (v) leaf node keys are retired after 'N' standard signature operations; and (vi) only the set of currently valid subordinate keys in scope are stored for handling validations.

Some embodiments of the present invention may include one, or more, of the following operations, features, characteristics and/or advantages: (i) extends the usable life of a master key pair with a finite number of allowed signature operations before being retired to avoid being compromised; (ii) retiring a key consists of deleting the private component or otherwise discontinuing to use it for generating signatures; and (iii) previously generated signatures remain valid, as this is not a "revocation" of the key as defined in X.509, which is a standard defining the format of public key certificates.

Referencing Table 1 below, some embodiments of the present invention may include one, or more, of the following operations, features, characteristics and/or advantages: (i) configures the master key pair as a subordinate Certificate Authority (CA); (ii) generates N finite operation key pairs and signs the subordinate finite operation keys with the master key to create N subordinate certificates; (iii) the N finite operation keys each then act as a master key in the next layer and each key in-turn acts as a subordinate CA, generates and signs another N finite operation keys resulting in N*N keys and N*N subordinate certificates in that layer; (iv) the process is continued for M levels and at each layer, the number of keys is N times the number of keys in the previous layer; (v) the master key is only usable for N operations; (vi) generating and signing N keys by the master key extends the usable lifespan of the master key to N*N operations; (vii) the number of available keys grows exponentially (N^M where M is the number of levels) where the certificate chain length is just 'M' at level M; and (viii) the server uses the leaf node keys for 'N' standard signatures each and they are validated by the client using the certificate chain of 'M' certificates.

TABLE 1

| Level | # Keys/Certificates |
| --- | --- |
| 0 | 1 (Master Key Pair) |
| 1 | N |
| 2 | N*N |
| ... | N*N*N ... |
| M | N^N |

Some embodiments of the present invention may include one, or more, of the following operations, features, characteristics and/or advantages: (i) when a flawed or operation limited key scheme becomes a standard, or more likely a standard becomes flawed or operation limited, an embodiment of the present invention becomes extremely valuable. This is a possible outcome from the current PQ key standardization process where new cryptographic operations may be standardized and deployed; (ii) keys need to be retired from use after a finite number of operations. This can be achieved simply by deleting the private key; (iii) state of the art encryption algorithms can benefit by extending the useful life of keys that are generated by encryption algorithms; and (iv) weaknesses can be mitigated by minimizing the exposure of any individual key.

An example implementation of the disclosure according to an embodiment of the present invention will now be discussed. Assume encryption algorithm 'a' can perform 'n' signature operations before it should no longer be used. This encryption algorithm includes: (i) a server has one randomly generated master key 'i' for algorithm 'a'; (ii) randomly generates 'n' keys of type 'a' named 'j[1 ... n]' and signs certificates 'c[1 ... n] for each with 'i'; (iii) for each j[x] (where x=1 to n), repeat the operations replacing i with j[x] to produce another layer of keys; and (iv) for each layer, the certificate chain increases in length by 1, but the number of keys at that level is multiplied by 'n'.

In some embodiments of the present invention, Table 2 below shows the keys at each level where: (i) the number of available keys grow geometrically (n^v where v is the number of levels), where the certificate chain length is just 'v'; and (ii) the server uses the leaf node keys for 'n' standard signatures each and they are validated by the client using the certificate chain of 'v' certificates.

TABLE 2

| i |
| --- |
| j1 j2 j3 ... jn |
| k1 k2 k3 ... kn*n |
| l1 l2 l3 ... l n*n*n |

Figure 4:
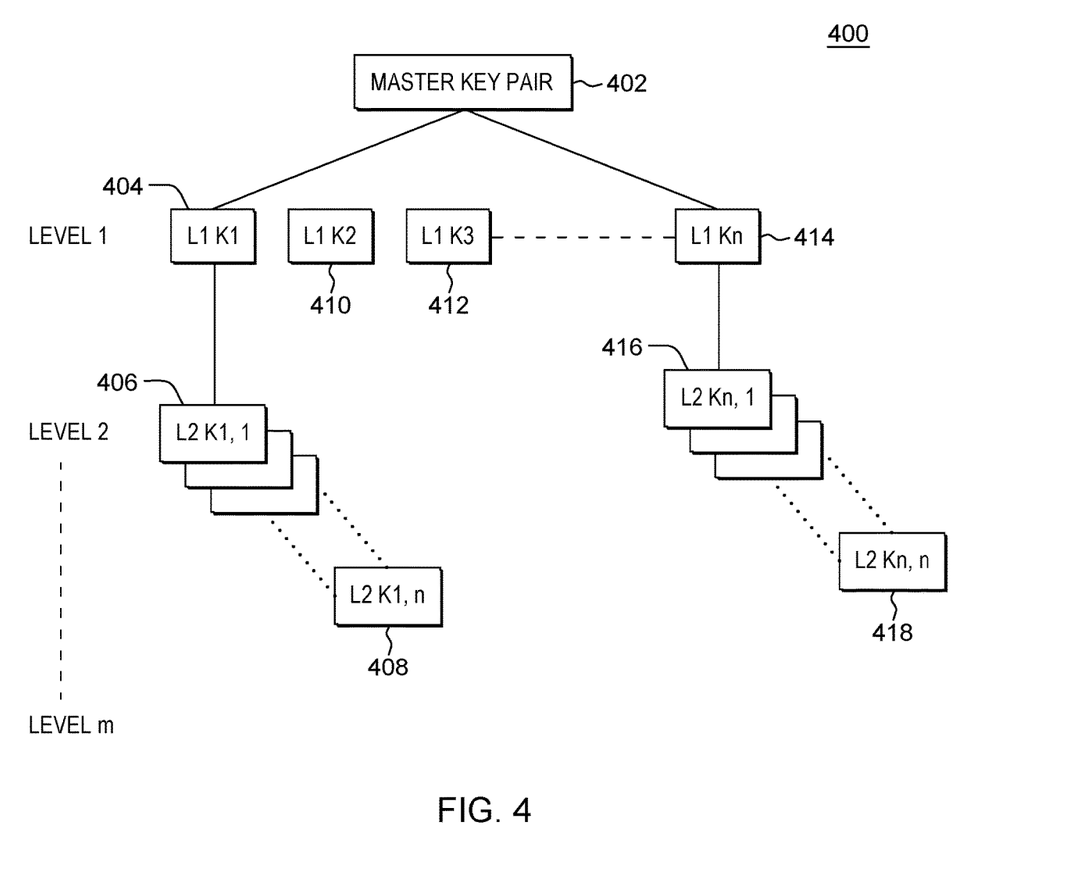
FIG. 4 is a diagram according to an embodiment of the present invention.

FIG. 4, diagram 400 includes the following: master key pair block 402, "L1 K1" block 404; "L2 K1, 1" block 406; "L2 K1, n" block 408; "L1 K2" block 410; "L1 K3" block 412; "L1 Kn" block 414; "L2 Kn, 1" block 416 and "L2 Kn, n" block 418.

Also, FIG. 4, diagram 400 shows the keys as an n-ary tree with m levels. For example, assume the master key is usable for 1000 operations. n=1000. Assuming the number of levels v=3, the life span of the master key is extended to 1000^3=1,000,000,000 operations. Practically 3 or 4 levels are probably sufficient as the number of keys at each level increases geometrically.

Some embodiments of the present invention note that the burden of maintaining revocation lists isn't as high as it might appear, as only one chain is active at any time and all leaf certificates can be discarded once they've all been used and revocation handled by revoking their root node instead. For example, imagine we have a root signing key with an algorithm good for only 1000 uses. We leverage that to 10^9 uses by using a three-layer tree. Initially we need to track 3 certificates for revocation. Master, level 1 cert 1, level 2 cert 1. That increases to 1002 certificates by the time level 2 cert 1 has been used up but once it's marked invalid, there's no need to track the certificates it issued for revocation, as marking it revoked also revokes the certificates it signed. Worst case is tracking 2001 certificates at near end of life. (Level 1 certs 1-1000, level 2 certs 1-1000 and the Master key pair). That's still a large number, but it's manageable with current technology.

Some embodiments of the present invention may include one, or more, of the following operations, features, characteristics and/or advantages: (i) extends usage life of keys with a limited number of allowed operations; (ii) exhibits operation limited key schemes; (iii) extends the life of keys to be retired after a finite number of operations; (iv) extends key life time; and (v) extends public and private key pair life time using hierarchy of subordinate certificates.

Some embodiments of the present invention may include one, or more, of the following operations, features, characteristics and/or advantages: (i) extends the life time of the master key with N as the number of allowed signing operations; (ii) the master key pair acts as a certificate authority and issues N keys by performing N signing operations; (iii) each of these N keys can further create N keys and greatly extend the lifetime of the original master key; (iv) extends the lifetime of the master key by issuing N new keys where N is the number of allowed signature operations for the master key. This process continues for multiple levels until enough keys are issued; (v) addresses the possibility of the cryptography algorithm being broken after a finite number of operations and therefore keys are limited to a finite number of operations; and (vi) extends the lifetime of asymmetric keys by issuing N new keys at each level where N is the number of allowed finite operations for the key.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for a limited operation asymmetric cryptographic key scheme, the method comprising:

configuring a master key pair for use in a cryptographic key system, the master key pair having certificate authority for a pre-defined number of signature operations;

generating a plurality of random key pairs from the master key pairs;

establishing a first certificate chain layer for the plurality of random key pairs by creating subordinate certificates for each random key pair in the plurality of random key pairs, each random key pair having the pre-defined number of signature operations of the master key pair;

repeating the configuring operation, the generating operation and the establishing for M layers, wherein M is an integer greater than or equal to one, and wherein each random key pair generated in a previous layer acts in the way that the master key pair does by generating another set of random keys and signing subordinate certificates in a next layer;

determining that a first leaf node key pair has been used a predetermined number of times, with the first leaf node key pair being a key pair most distant from a root level of a hierarchy of key pairs of M layers created by repeating the configuring, generating and establishing operations;

responsive to the determination that the first leaf node key pair has been used a predetermined number of times, retiring the first leaf node key pair;

and validating each random key pair used for signature operation by retrieving from storage of client computer system key pairs required for validation operation, wherein the validation operation is handled remote from hardware hosting the limited operation asymmetric cryptographic key scheme.

2. A computer program product for a limited operation asymmetric cryptographic key scheme, the computer program product comprising:

a set of storage device(s);

and computer code stored collectively in the set of storage device(s), with the computer code including data and instructions to cause a processor(s) set to perform at least the following operations:

configuring a master key pair for use in a cryptographic key system, the master key pair having certificate authority for a pre-defined number of signature operations;

generating a plurality of random key pairs from the master key pairs;

establishing a first certificate chain layer for the plurality of random key pairs by creating subordinate certificates for each random key pair in the plurality of random key pairs, each random key pair having the pre-defined number of signature operations of the master key pair;

repeating the configuring operation, the generating operation and the establishing for M layers, wherein M is an integer greater than or equal to one, and where each key pair generated in a previous layer acts in the way that the master key pair does by generating another set of random keys and signing subordinate certificates in a next layer;

determining that a first leaf node key pair has been used a predetermined number of times, with the first leaf node key pair being a key pair most distant from a root level of a hierarchy of key pairs of M layers created by repeating the configuring, generating and establishing operations;

responsive to the determination that the first leaf node key pair has been used a predetermined number of times, retiring the first leaf node key pair;

and validating each random key pair used for signature operation by retrieving from storage of client computer system key pairs required for validation operation, wherein the validation operation is handled remote from hardware hosting the limited operation asymmetric cryptographic key scheme.

3. A computer system for a limited operation asymmetric cryptographic key scheme, the computer system comprising:

a processor(s) set;

a set of storage device(s);

and computer code stored collectively in the set of storage device(s), with the computer code including data and instructions to cause the processor(s) set to perform at least the following operations:

configuring a master key pair for use in a cryptographic key system, the master key pair having certificate authority for a pre-defined number of signature operations;

generating a plurality of random key pairs from the master key pairs;

establishing a first certificate chain layer for the plurality of random key pairs by creating subordinate certificates for each random key pair in the plurality of random key pairs, each random key pair having the pre-defined number of signature operations of the master key pair;

repeating the configuring operation, the generating operation and the establishing for M layers, wherein M is an integer greater than or equal to one, and where each key pair generated in a previous layer acts in the way that the master key pair does by generating another set of random keys and signing subordinate certificates in a next layer;

determining that a first leaf node key pair has been used a predetermined number of times, with the first leaf node key pair being a key pair most distant from a root level of a hierarchy of key pairs of M layers created by repeating the configuring, generating and establishing operations;

responsive to the determination that the first leaf node key pair has been used a predetermined number of times, retiring the first leaf node key pair;

and validating each random key pair used for signature operation by retrieving from storage of client computer system key pairs required for validation operation, wherein the validation operation is handled remote from hardware hosting the limited operation asymmetric cryptographic key scheme.

* * * * *